United States Patent [19]

Carman

[11] Patent Number: 5,408,448

[45] Date of Patent: Apr. 18, 1995

[54] DEVICE AND METHOD FOR CD SHUFFLE PLAY

[75] Inventor: Dan D. Carman, Russiaville, Ind.

[73] Assignee: Delco Electronics Corporation, Kokomo, Ind.

[21] Appl. No.: 133,351

[22] Filed: Oct. 8, 1993

[51] Int. Cl.$^6$ ............................................. G11B 7/085
[52] U.S. Cl. ........................................ 369/32; 369/47; 369/33
[58] Field of Search ................. 369/32, 33, 47, 48, 369/54, 124

[56] References Cited

U.S. PATENT DOCUMENTS

| | | | |
|---|---|---|---|
| 4,779,252 | 10/1988 | Custers et al. | 369/32 |
| 4,787,073 | 11/1988 | Masaki | 369/32 |
| 4,811,315 | 3/1989 | Inazawa | 369/32 |
| 4,949,322 | 8/1990 | Kimura et al. | 369/32 |
| 5,051,971 | 9/1991 | Yamagishi et al. | 369/32 |
| 5,063,547 | 11/1991 | Custers et al. | 369/32 |
| 5,109,365 | 4/1992 | Watanabe et al. | 369/32 |
| 5,301,172 | 4/1994 | Richards et al. | 369/32 |

Primary Examiner—Georgia Y. Epps
Assistant Examiner—Tan Dinh
Attorney, Agent, or Firm—Jimmy L. Funke

[57] ABSTRACT

Varying the selection and play of tracks on a CD in non-sequential order includes a CD mechanism (12) with which a processor (16) communicates, a keyboard (17) having a shuffle play key (18) for user actuation, and a disc and track display (19). The processor (16) generates a shuffled selection offset ($T_n$) from a deterministic function based upon a sequence number ($S_n$) and a random seed (Seed). The deterministic function includes performance of plurality of binary operations which may include bit inversions, exclusive OR with an N-bit constant, N-bit rotations, bit swapping, one to one substitutions, and modulus additions and subtractions. The generated sequence plays all selections before any selection is repeated, allows the user to replay any past selection or skip to any unplayed selection while maintaining the same order, requires minimal memory and execution time, and is suitable for use with single-disc CD players and multi-disc CD changers.

9 Claims, 2 Drawing Sheets

DEVICE AND METHOD FOR CD SHUFFLE PLAY

The present invention relates generally to devices capable of directly accessing individual selections on playback media having multiple selections, such as audio equipment that can play one or more Compact Discs (CDs), mini-discs or Digital Audio Tapes (DATs). More particularly, the present invention relates to audio equipment that is capable of playing individual audio selections in varying non-sequential order, such as, for example, single-disc CD players or multi-disc CD changers (CDCs).

BACKGROUND ART

Digital technology has enabled manufacturers of CD players to provide a so-called random play mode in which CD selections are played in varying non-sequential order. One approach, for example, uses a uniform random number generator such as a free running timer to generate numbers from which choice of the next selection may be determined. However, this approach allows unlimited repetition of selections before all selections have been played, a characteristic disliked by many CD player users, and does not allow users to replay any number of past selections or skip to as yet unplayed selections without loss of the current sequence, a feature sought by many CD player users.

Another approach that plays CD selections in varying non-sequential order is a variant of the preceding approach in which a number generator and memory array is employed to memorialize "played" selections, eliminating selection repetition. But once again, users may not move through the selection sequence.

CD players have allowed random choice and play of selections without repetitions (before playing of all other selections), and user chosen selection replays and skips where a complete selection sequence has been stored in memory and an index used to identify current selection. Inasmuch as a single CD may have up to ninety-nine selections (on individual "tracks"), and CD changers provided with up to twelve or more discs, the amount of memory and execution time required to implement this approach is significant and prohibitive.

SUMMARY OF THE INVENTION

It is, therefore, an object of the present invention to provide a device and method for choosing and playing individual selections on a digital audio recording in varying non-sequential order that the user of such device is unable to predict.

It is another object of the present invention to provide a device and method, as above, in which all selections are played before any selection is repeated.

It is still another object of the present invention to provide a device and method, as above, which the user may replay any past selection or skip to any unplayed selection while maintaining the same order (i.e., the user may move through the sequence).

It is yet another object of the present invention to provide a device and method, as above, in which the amount of necessary memory and execution time are minimized.

It is a further object of the present invention to provide a device and method, as above, which is suitable for use with single-disc CD players and multi-disc CD changers.

These and other objects and advantages of the present invention over existing prior art forms will become more apparent and fully understood from the following description in conjunction with the accompanying drawings.

In general, a device for choosing individual selections on a digital audio recording in varying non-sequential order includes means for playback of chosen selections on a digital audio recording, key means for receipt of a user command for playback in varying non-sequential order, and processor means communicating with the means for playback, receiving the user command from the key means, and calculating a random selection from a deterministic function $T_n = \text{SHUFFLE}(S_n, \text{Seed})$ as follows

```
T_n := G_1(S_n)
S_d := Seed
for I := 1 to M_1
begin
    T_n := F_1(T_n, S_d)
    ...
    T_n := F_n(T_n, S_d)
    S_d := Rotate (S_d, M_2, N_2)
end;
T_n = G_2 (T_n);
``` were $T_n$ is a Selection Offset, $S_n$ is a sequence number, Seed is an unsigned uniform random value, $S_d$ is a temporary value, $F_1 \ldots F_n$ are a series of closed operations using the current values of $T_n$ and $S_n$, Rotate $(S_d, M_2, N_2)$ circularly shifts a number $S_d$, having $N_2$ bits, to the right $M_2$ times, $M_1$ is a number of loops, $M_2$ is the fixed number of bits the temporary value $S_d$ is to be rotated; $N_2$ is the number of bits in a seed; and, $G_1 \ldots G_n$ are closed operations based upon only $T_n$.

In general, a method for choosing and playing individual selections on a digital audio recording in varying non-sequential order include the steps of selecting a sequence number and a random seed and calculating a shuffled selection offset that corresponds to a unique selection on the digital audio recording using a deterministic function based upon the sequence number and the random seed. The chosen selection is determined from the shuffled selection offset and played.

PREFERRED EMBODIMENT FOR CARRYING OUT THE INVENTION

Figure 1:
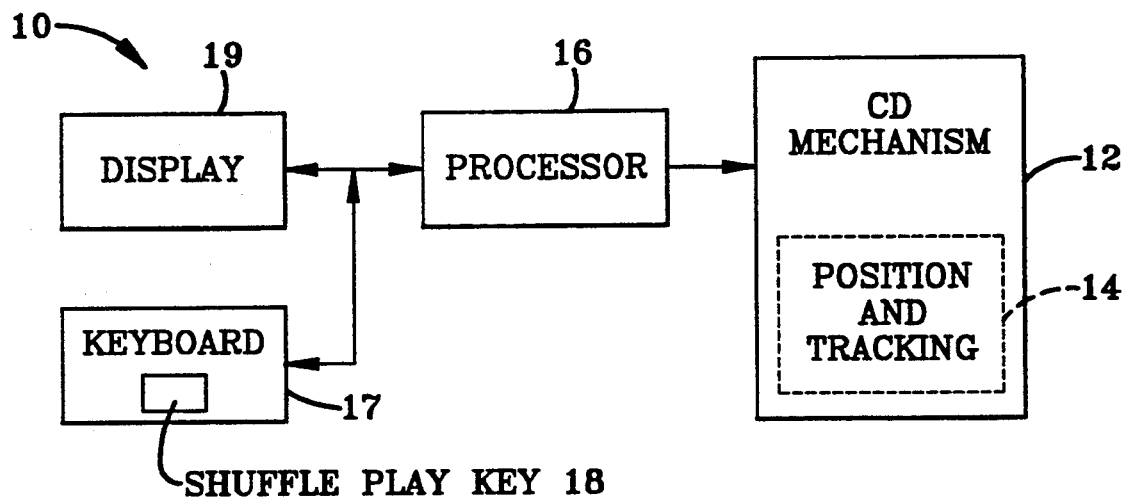
FIG. 1 is a block diagram of an exemplary CD mechanism in accordance with the concept of the present invention for furnishing a digital recording shuffle playback operating mode.

FIG. 1 presents in block diagram form an exemplary device, generally indicated by the reference numeral 10, for furnishing a digital recording shuffle playback operating mode in a digital audio playback device such as a CD player or a CD changer. Device 10 may include a conventional CD mechanism 12 including position and tracking means 14 for playing a chosen track on a single-disc CD, or playing a chosen track on a chosen disc in a multiple-disc CD changer. CD mechanism 12 communicates with and is controlled by a processor 16, which in turn communicates with a keyboard 17 having a key 18 for user selection of the shuffle playback operating mode and such other keys as may be desired, and a display 19 for depicting at least the chosen disc and track.

Device 10 chooses a non-sequentially ordered track by generating a track offset with a deterministic function, which may be called SHUFFLE, having a sequence number ($S_n$) and a random seed (Seed). Expressed mathematically, $T_n := SHUFFLE(S_n, Seed)$ where $S_n$ is the current sequence number that may be incremented or decremented to produce the next or previous shuffled selection, Seed is a pseudo-random value that selects a given sequence of play, and $T_n$ is the corresponding shuffled selection offset that is converted to an actual disc and selection number. Thus, knowing the SHUFFLE function, storing only the current sequence number $S_n$ and the Seed allows rapid computation of the entire sequence with only minimal resources.

A preferred SHUFFLE function should possess a number of characteristics to achieve optimally the objectives of the present invention. First, the function must be closed and provide a unique one to one mapping of the current sequence number $S_n$ to a shuffled selection offset $T_n$, thereby insuring that each individual selection is chosen only once each sequence. Second, each Seed value must produce a different mapping of the current sequence number $S_n$ to the shuffled selection offset $T_n$. Third, the probability of mapping of the current sequence number $S_n$ to any specific shuffled selection offset $T_n$ must be approximately the same as mapping to any other shuffled selection offset, thereby insuring that the user cannot consistently predict the next selection. Fourth, the SHUFFLE function must be scalable to the total number of selections available, thereby insuring minimal execution time. Finally, the SHUFFLE function must be executable using only the processors typical of audio playback equipment, such as microcontrollers and microprocessors, using standard integer instructions, further minimizing execution time and resource demands.

A SHUFFLE algorithm that possesses the preceding characteristics may be described as follows.

```
Tn= SHUFFLE(Sn,Seed)
  begin
    Tn:=G1(Sn)
    Sd:=Seed
    for I:=1 to M1
    begin
      Tn:=F1(Tn,Sd)
      ...
      Tn:=Fn(Tn,Sd)
      Sd:=Rotate (Sd,M2,N2)
    end;
    Tn=G2(Tn);
  end;
``` where, implemented in a binary system, $T_n$ is the Selection Offset of N bit length that is subsequently converted to an actual Disc and Selection Number; $S_n$ is a sequence number of N bit length that is incremented linearly to sequence through the shuffled order; Seed is an unsigned uniform random value (such as may be obtained from a free running timer) of at least N bit length from which the particular sequence is generated; $S_d$ is a temporary value; $F_1 \ldots F_n$ are a series of closed operations of N bits using the current values of $T_n$ and $S_n$ as discussed further hereinafter; Rotate (X,Y,Z) circularly shifts a number X, having Z bits, to the right Y times to insure that all portions of a seed are used in the mapping where the size of the seed is larger than the size of the offset; $M_1$ is the number of loops, preferably three, during which complete mappings are made to insure sufficient randomness in the distribution of the results; $M_2$ is the fixed number of bits the temporary value $S_d$ is to be rotated; $N_2$ is the number of bits in a seed, generally a constant for a given number of total tracks; and, $G_1 \ldots G_n$ are closed operations based upon only $T_n$, as are also discussed further hereinafter.

Significant to generating the desired sequence are the operations $F_1 \ldots F_n$ using the current values of $T_n$ and $S_n$. These functions must be closed over the domain of possible selection values (M=0 to $2^N-1$), provide unique one to one mapping of $S_n$ to $T_n$, and be reversible (i.e., for F(x) there must be an inverse function $F^{-1}(x)$ such that $x = F^{-1}(F(x))$ for all values of x in the domain). The following operations fulfill such requirements in a binary based system and are well suited for implementation by a digital processor such as processor 16: bit inversions, exclusive OR with an N-bit constant, N-bit rotations, bit swapping, one to one substitutions, and modulus additions and subtractions.

Significant to insuring adequate "randomness" in the generated sequences are the operations $G1 \ldots Gm$ using the current value of $T_n$. These operations are desirable because all seed values may not generate sequences of the same level of randomness, and furnish a minimum complexity of the mapping irrespective of the chosen seed value.

Where a SHUFFLE function is being implemented to select up to two hundred fifty-six tracks using three to eight data bits, a specific algorithm that has been found desirable is as follows.

```
Tn= SHUFFLE(Sn,Seed)
  begin
    Sd:=Seed
    Tn:=(Sn * 17) AND (2N−1)
    Tn:=Rotate (Tn,1,N)
    Tn:=Tn XOR AAh
    for I: = 1 to 3
    begin
      Tn:=Tn XOR Sd
      Tn:=Tn+ Sd
      Tn:=NOT Tn
      Tn:=Tn AND (2N−1)
      Tn:=Rotate (Tn, (Sd AND 03h) +1,N)
      Sd:=Rotate(Sd,2,8)
    end;
    Tn=(Tn AND F8h) OR TableLookUp (Tn AND 07h);
    Tn=Rotate (Tn,1,N)
  end;
``` where TableLookUp returns the number 5, 0, 3, 4, 2, 1, 6 or 7 when the three least significant bits from the number that results from the ANDing of $T_n$ with 07 is 0, 1, 2, 3, 4, 5, 6, or 7, respectively. The operation $T_n := T_n$ AND $(2^N-1)$ maintains the addition and inversion closed over N bits. The operation $T_n := Rotate(T_n, (S_d$ AND 03h$)+1, N)$ uses the value of the two least significant bits of $S_d$ to shift $T_n$ one to four bits.

Figure 2A:
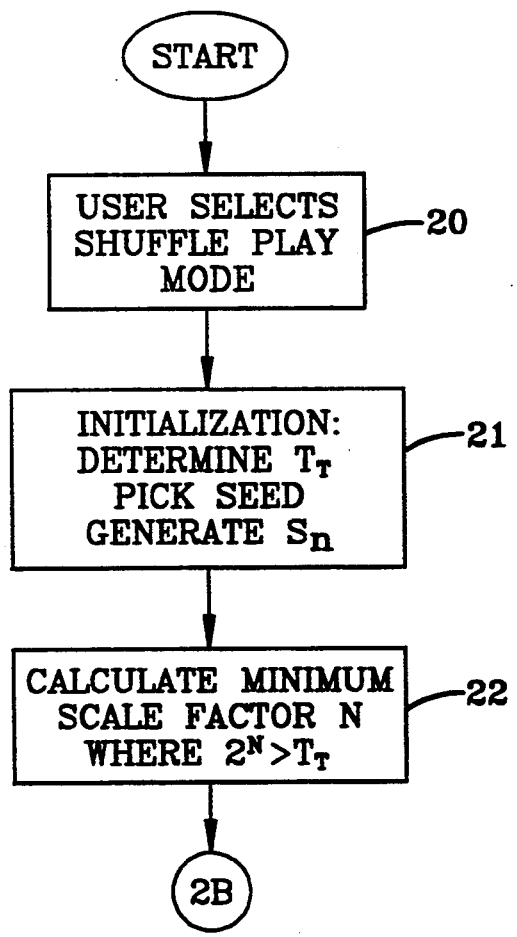
FIG. 2A is a partial top level flow chart of an exemplary method for furnishing a digital recording shuffle playback operating mode in a digital audio playback device such as a CD player or a CD changer.
Figure 2B:
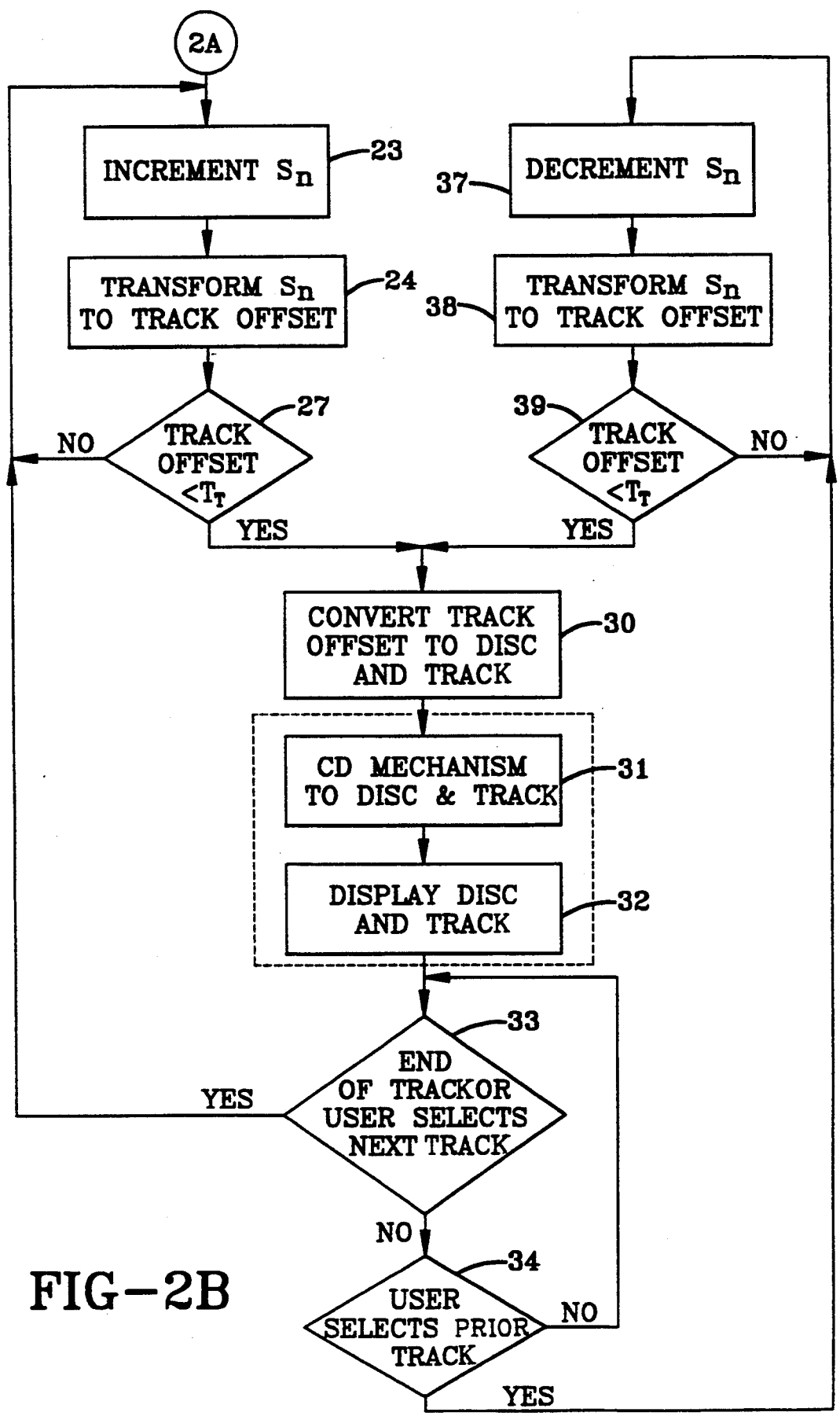
FIG. 2B is a continuation of the partial top level flow chart of an exemplary method for furnishing a digital recording shuffle playback operating mode in a digital audio playback device such as a CD player or a CD changer shown in FIG. 2A.

An exemplary operation of the SHUFFLE function is illustrated in block diagram form in FIGS. 2A and 2B, and is begun when the user selects SHUFFLE mode play in step 20 by pressing shuffle play key 18. Next processor 16 performs certain initialization activities in step 21 such as querying CD mechanism 12 to determine the total number of selections ($T_T$), pick a Seed and generate a Sequence Number ($S_n$).

The Sequence Number ($S_n$) must be scaled to insure it falls within a range of values that will transform to one of the total number of selections ($T_T$). In step 22 a minimum scale factor N is calculated where $2^N > T_T$. Scaling the SHUFFLE function to the power of two next larger than the total number of selections $T_T$ minimizes execution time. Selection of the next or previous shuffle selection may be readily accomplished by repeatedly incrementing or decrementing (as appropriate) the index and performing the SHUFFLE function until the result is less than the total number of selections. In this manner the sequence for $T_T - 1$ total selections will be the same as the sequence for $T_T$ total selections without the last selection, for the same scaling and seed values.

Once minimum scale factor N is found, the Selection Number ($S_n$) is incremented in step 23 and transformed to a track offset in step 24. For a single disc, the offset may be simply added to the first selection on the disc to generate the actual selection number. For a changer, the offset may be added to the first selection in the magazine, where the selections for each disc are considered to be sequential to the previous disc (i.e., where the first disc has ten selections, the first selection of the next disc is considered to be the eleventh selection of the magazine). The sequence for a changer may be varied further by initiating the offset from a disc other than the first disc in the magazine or changer (e.g., add the offset to the first selection of the third disc in the magazine).

The skilled artisan will appreciate that the SHUFFLE function may return a Selection Number ($S_n$) more than the total number of Selections ($T_T$). Because the domains are based upon powers of two, the SHUFFLE function may be scaled to insure that the likelihood of a result less than the total number of Selections ($T_T$) is always greater than 0.5. Under such circumstances the SHUFFLE function will require execution less than $2^{N-1}$ times to obtain a workable result. Nevertheless, judicious selection of the nature and sequence of SHUFFLE function operations can significantly reduce the number of times the SHUFFLE function must be performed to return a Selection Number ($S_n$) less than the total number of Selections ($T_T$).

Therefore, after the Selection Number ($S_n$) has been transformed to a track offset, it is tested in step 27 to see if it is less than the total number of Selections ($T_T$). If not, the number of Selections ($S_n$) is again incremented, the transformation repeated and the result retested. If so, as explained hereinabove the track offset is converted to a disc and track number in step 30, and an appropriate command signal is transmitted to CD mechanism 12 to go to that disc and track and play and display the same (steps 31 and 32).

Thereafter, upon completion of play or the user selection of the next track for play, as determined in step 33, the process is begun again with incrementing the Selection number ($S_n$). If, however, play is not complete and the user selects a prior track for play, as determined in step 34, the Selection number ($S_n$) is decremented in step 37, transformed to a track offset in step 38, and checked in step 39 to see if the track offset is less than the total number of Selections ($T_T$), as performed in steps 24 and 27, respectively.

The skilled artisan will appreciate that the device and method of the present invention provides a large number of different, repeatable sequences which include each selection only once before all other selections are played and are scaled to the total number of tracks available at the time of play. Moreover, only basic processor instructions are used to implement the method, allowing efficient, inexpensive computation without such resource demands as large quantities of memory and floating point math calculation capabilities.

It will be further understood by the skilled artisan that the device and method of the present invention is well suited for application with any device capable of directly accessing individual selections on the playback media, such as equipment that can play one or more CDs, mini-discs or DATs.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed and method performed according to the concept of the present invention, and reasonably equivalent thereto, will accomplish the objects of the present invention and otherwise substantially improve the art of playing CD selections in a varying non-sequential order.

I claim:

1. A device for choosing in varying non-sequential order individual selections from playback media having a plurality of individual selections, comprising:

means for playback of chosen individual selections from playback media;

key means for receipt of a user command for playback of the individual selections in varying non-sequential order;

processor means receiving said user command from said key means and responsively calculating a random selection from a deterministic function $T_n = \text{SHUFFLE}(S_n, \text{Seed})$ as follows $$T_n := G_1(S_n)$$
$$S_d := \text{Seed}$$
$$\text{for } I := 1 \text{ to } M_1$$
$$\text{begin}$$
$$\quad T_n := F_1(T_n, S_d)$$
$$\quad \ldots$$
$$\quad T_n := F_n(T_n, S_d)$$
$$\quad S_d := \text{Rotate}(S_d, M_2, N_2)$$
$$\text{end;}$$
$$T_n = G_2(T_n);$$

where $T_n$ is a Selection Offset, $S_n$ is a sequence number, Seed is an unsigned uniform random value, $S_d$ is a temporary value, $F_1 \ldots F_n$ are a series of closed operations using the current values of $T_n$ and $S_n$, Rotate ($S_d$, $M_2$, $N_2$) circularly shifts a number $S_d$, having $N_2$ bits, to the right $M_2$ times, $M_1$ is a number of loops, $M_2$ is the fixed number of bit the temporary value $S_d$ is to be rotated; $N_2$ is the number of bits in a seed; and $G_1 \ldots G_n$ are closed operations based upon only $T_n$; and said processor means further including means for determining a chosen selection from said selection Offset $T_n$ and for communicating with said means for playback to play the chosen selection determined from said Selection Offset.

2. A device, as set forth in claim 1, wherein the playback media is a digital audio recording, and further including display means for receiving from said processor means and displaying said chosen individual selection, said processor means performing calculations in binary, including a plurality of operations selected from the group of bit inversions, exclusive OR with an N-bit constant, N-bit rotations, bit swapping, one to one substitutions, and modulus additions and subtractions.

3. A device, as set forth in claim 2, wherein said digital audio recording is a CD, and said deterministic function selects from up to two hundred fifty-six individual selections using a plurality of data bits in the range of three to eight, as follows

```
S_d := Seed
T_n := (S_n * 17) AND (2^N - 1)
T_n := Rotate(T_n, 1, N)
T_n := T_n XOR AAh
for I:= 1 to 3
begin
    T_n := T_n XOR S_d
    T_n := T_n + S_d
    T_n := NOT T_n
    T_n := T_n AND (2^N - 1)
    T_n := Rotate(T_n, (S_d AND 03h)+1, N)
    S_d := Rotate(S_d, 2, 8)
end;
T_n = (T_n AND F8h) OR TableLookUp(T_n AND 07h);
T_n = Rotate(T_n, 1, N)
``` where TableLookUp returns the number 5, 0, 3, 4, 2, 1, 6 or 7 when the three least significant bits from the number that results from the ANDing of $T_n$ with 07 is 0, 1, 2, 3, 4, 5, 6, or 7, respectively.

4. A method for choosing individual selections from playback media having a plurality of individual selections and playing the individual selections in varying non-sequential order, comprising the steps of:

(i) selecting a sequence number and a random seed in response to a user selecting a non-sequential playback mode;

(ii) calculating a shuffled selection offset that corresponds to a unique selection on the playback media using a predetermined function based upon said sequence number and said random seed;

(iii) determining the chosen selection from said shuffled selection offset, and, (iv) playing the chosen selection determined from said shuffled selection offset.

5. A method, as set forth in claim 4, wherein the playback media is a digital audio recording and said step (ii) of calculating a shuffled selection offset includes the step of performing a plurality of binary operations selected from the group of bit inversions, exclusive OR with an N-bit constant, N-bit rotations, bit swapping, one to one subtractions, and modulus additions and subtractions, beginning with said sequence number and said seed to generate said shuffled selection offset.

6. A method, as set forth in claim 5, wherein said digital audio recording is a CD, and said step (ii) of calculating a shuffled selection offset includes the step of performing the following

```
T_n = SHUFFLE(S_n, Seed)
begin
    T_n := G_1(S_n)
    S_d := Seed
    for I:= 1 to M_1
    begin
        T_n := F_1(T_n, S_d)
        ...
        T_n := F_n(T_n, S_d)
        S_d := Rotate(S_d, M_2, N_2)
    end;
    T_n = G_2(T_n);
end;
``` where $T_n$ is said shuffled Selection Offset of N bit length; $S_n$ is a sequence number of N bit length that is incremented linearly to sequence through the shuffled order; Seed is an unsigned uniform random value of at least N bit length from which the particular sequence is generated; $S_d$ is a temporary value; $F_1 \ldots F_n$ are said series of closed operations of N bits using the current values of $T_n$ and $S_n$; Rotate (X,Y,Z) circularly shifts a number X, consisting of Z bits, to the right Y times; $M_1$ is a loop counter; $M_2$ is the fixed number of bits the temporary value $S_d$ is to be rotated; $N_2$ is the number of bits in a seed; and, $G_1 \ldots G_n$ are closed operations based upon only $T_n$.

7. A method, as set forth in claim 6, wherein said predetermined function selects from up to two hundred fifty-six individual selections using a plurality of data bits in the range of three to eight, and said step (ii) of calculating a shuffled selection offset includes the step of performing the following

```
T_n = SHUFFLE(S_n, Seed)
begin
    S_d := Seed
    T_n := (S_n * 17) AND (2^N - 1)
    T_n := Rotate(T_n, 1, N)
    T_n := T_n XOR AAh
    for I:= 1 to 3
    begin
        T_n := T_n XOR S_d
        T_n := T_n + S_d
        T_n := NOT T_n
        T_n := T_n AND (2^N - 1)
        T_n := Rotate(T_n, (S_d AND 03h)+1, N)
        S_d := Rotate(S_d, 2, 8)
    end;
    T_n = (T_n AND F8h) OR TableLookUp(T_n AND 07h);
    T_n = Rotate(T_n, 1, N)
end;
``` and TableLookUp includes the step of returning the number 5, 0, 3, 4, 2, 1, 6 or 7 when the three least significant bits from the number that results from the ANDing of $T_n$ with 07 is 0, 1, 2, 3, 4, 5, 6, or 7, respectively.

8. A method as set forth in claim 4, further including the steps of:

(v) incrementing the sequence number in response to the user selecting a next track for play and then performing the above steps of (ii)–(iv).

9. A method as set forth in claim 4, further including the steps of:

(v) decrementing the sequence number in response to the user selecting a prior track for play and then performing the above steps of (ii)–(iv).

* * * * *